United States Patent
Williamson et al.

(10) Patent No.: US 6,373,923 B1
(45) Date of Patent: Apr. 16, 2002

(54) LINE TESTING METHOD AND APPARATUS THEREFOR

(75) Inventors: Roger James Williamson, Much Hadham; Michael Francis Grant, Bishops Stortford, both of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/185,390

(22) Filed: Nov. 3, 1998

(51) Int. Cl.$^7$ .......................... H04M 1/24; H04M 3/08; H04M 3/22

(52) U.S. Cl. ................ 379/22.01; 379/1.04; 379/15.03; 379/22.04; 379/22.02

(58) Field of Search .................................. 375/224, 228; 379/1.03, 15.03, 22.04, 27.01, 29.01, 31, 22.01, 22.02; 370/248, 249

(56) References Cited

U.S. PATENT DOCUMENTS

| | | | |
|---|---|---|---|
| 5,572,570 A | * | 11/1996 | Kuenzig |
| 6,002,671 A | * | 12/1999 | Kahkoska et al. |
| 6,052,565 A | * | 4/2000 | Ishikura et al. |
| 6,058,162 A | * | 5/2000 | Nelson et al. |
| 6,061,427 A | * | 5/2000 | Ryoo |
| 6,091,713 A | * | 7/2000 | Lechleider et al. |
| 6,212,229 B1 | * | 4/2001 | Salinger |
| 6,219,378 B1 | * | 4/2001 | Wu |

* cited by examiner

*Primary Examiner*—Duc Nguyen
(74) *Attorney, Agent, or Firm*—Lee,Mann,Smith, McWilliams,Sweeney & Ohlson (57) ABSTRACT

To facilitate the use of relatively high frequency data transmission services over a wireline communication resource originally deployed to support low frequency voice band services, an assessment of the wireline communication resource (50-52) is based on attenuation of high frequency test signals, of known original level, that are generated (18) injected into the wireline communication resource from a test point (12). A detector (60) at a potential point of service, e.g. at a customers' premises (14), detects an attenuated level of the test signals and generates a control signal (70, 82), such as a drive current, indicative of the attenuation caused by the wireline communication resource (50-52). The control signal (70, 82) is then indirectly communicated back to the test point (12) in a coded form, and preferably within a voice band transmission. The coded form may be realized as modulation of a power supply provided to the customers' premises by the wireline communication resource, or could be achieved by up-link frequency mixing. In its most basic form, the control signal causes fluctuation on a visual level indicator at the customers' premises and therefore relies on a customer providing a verbal or toned response to the test point as to the level of the visual indicator. Effective attenuation at high frequencies can then be assessed based upon analysis of information coded into the voice band signal and its direct relationship with the original level of the injected high frequency signals.

35 Claims, 3 Drawing Sheets

Fig. 1

LINE TESTING METHOD AND APPARATUS THEREFOR

BACKGROUND TO THE INVENTION

This invention relates, in general, to a method of and apparatus for testing a telecommunication link and is particularly, but not exclusively, applicable to a method of and apparatus for testing a copper pair (connecting a telephone exchange to a subscriber unit) to determine its ability to support high frequency data transmissions that are ancillary to its originally designated function of supporting voice telephony.

SUMMARY OF THE PRIOR ART

The connection between individual telephone subscribers, whether these are domestic or business subscribers, and a local telephone exchange has traditionally been provided using copper cables consisting of a number of unshielded twisted-pair wires, usually known as "copper pairs". More explicitly, network topology has a multi-pair cable emanating from an exchange, which multi-pair cable is gradually split out to provide one (and sometimes a plurality) of single copper pairs at a customer's premises. When these copper pairs were first deployed in local areas, it was assumed that they would be used for transmission of voice signals only; these wireline connections were therefore expected to operate in a frequency range of less than about 4 kilohertz (kHz). Consequently, the planning rules adopted for such wireline (i.e. copper pair) systems were based on easily controlled and measured parameters, such as loop resistance and low frequency attenuation. In the UK, the normal planning limits are 1000 Ohms ($\Omega$) loop resistance and seven decibel (7 dB) attenuation at 1 kHz.

These planning limits are achieved by a suitable choice of conductor gauge or diameter depending on the route distance between the exchange and the customer. Longer routes clearly require larger conductors in order to meet the resistance and attenuation limits. Conductors tend to be between 0.3 mm and 0.9 mm in diameter, with increasingly larger diameter conductors being used the further the cable extends from the exchange. This allows for bundles of narrow gauge pairs to be grouped together at an exchange thus minimising cable handling problems.

As the number of new subscribers obtaining telephone services from operators utilising optical feeders increases, telephony providers, whose systems are largely constructed of copper pairs, are increasingly looking to the provision of wideband and broadband services to their customers over their copper pair links. With the advent of wideband and broadband services (such as internet access, video-on-demand and digital data transmissions) as well as increases in the volume of telephony services and traffic, telephony providers are necessarily considering the testing of individual links between exchanges and subscribers in order to ascertain whether or not each link will support the provision of such services. In particular, lines must presently be tested to see if they will support present ISDN services while, as time passes, further tests will more frequently need to ascertain whether or not these twisted pairs will support broadband services requiring technologies such as asynchronous digital subscriber line signalling (ADSL), high speed digital subscriber line signalling (HDSL) and very high speed digital subscriber line signalling (VDSL); these transmission techniques are generically termed xDSL transmissions. Indeed, the more exotic forms of xDSL use wideband techniques for enhanced data capacity (presently up to about ten megabits per second, 10 Mbps), with such wideband techniques distributing information across a number of sub-carriers, e.g. as supported by discrete multitone (DMT) and orthogonal frequency division multiplexing (OFDM).

In contrast with audio signals that have a frequency of less than about 4 kHz, broadband signals may be in the range 25 kHz to 10 MHz, and more usually exceed 1 MHz in order to support broadband applications.

One of the key basic parameters for establishing the suitability of a particular copper pair for carrying such broadband services is its transmission length (arising as a consequence of signal attenuation increasing with transmission length). Unfortunately, this is not readily deducible from the records of a particular operator, even if they are accurate. This is because, although the records show duct routes and section lengths, they do not necessarily indicate how a cable is routed through the duct. For example, it is often found that a copper pair in a specific cable will transverse the full length of the duct to a splice point and then return along the same duct as a pair in another possibly smaller cable.

Furthermore, it will be understood that cabling diameters also play a significant role at high frequencies since signal transmission in cable (at these higher frequencies) is principally through the so-called "skin effect", while loss (i.e. signal attenuation) is also skin effect dependent. Specifically, loss is proportionally greater in smaller gauge cables. While these effects are not important with voice signals, these effects are considerable in relation to higher frequency transmissions because the associated error in the determination can yield misleading results. More particularly, the attenuation at low frequencies (used for narrowband voice communication below about 4 kHz) is primarily dominated by direct current (DC) resistance that is inversely proportional to the cross-sectional area of the wires. At relatively high frequencies (such as employed in xDSL), the dominant skin effect exhibits attenuation that is inversely proportional to the circumference of the wires and also proportional to the square root of the frequency. Thus, the amount of attenuation increases with frequency.

It is equally misleading to use measurements based on grid references in order to predict lengths, because the necessary scaling factor of actual cable length to direct distance is unknown in any specific instance. For example, in the UK, the average scaling factor is probably somewhere between 1.4 and 2.0; the resulting distances are often enough to render a link unsuitable for the provision of wideband or broadband services, while the uncertainty in ascertaining actual cable route lengths makes this method highly inaccurate. In addition, end-to-end connections may include sections of aluminium (or differing numbers of junctions) which will have different transmission characteristics to the copper sections. Aluminium was used in this way when copper prices made copper less economic than aluminium.

Of course, there are other factors that contribute to attenuation or loss, but these are of relatively minor importance and deserve just a passing note, namely loss caused within the dielectric between copper pairs and impedance mismatch at discontinuities, such as at joints between cabling sections.

One alternative approach is for operators to dispatch staff to a customer's premises to undertake one or a series of measurements of the copper cable and its performance, so called "truck roll". This is a time consuming and consequently expensive solution, especially if the customer decides not to take the service, or takes it only for a short period.

A variation on full truck roll is for the operator to take field-based sample measurements of cable lengths and performances from the exchange to the local telephone cabinet, from where individual copper pairs are directed to individual subscribers. As the cables from the exchange to the cabinet are shared this would reduce the cost per customer line, but would only give an indication in relation to a few of the copper pairs from any particular exchange. Equally this latter method gives no indication of the length and performance of the copper drops from the cabinet into a customer's premises. This method is, therefore, again rather inaccurate.

Time domain reflectometry (TDR) is a technique primarily used for determining a discontinuity or breakage in a cable. However, this may be usable to test a link from an exchange to a subscriber unit. Unfortunately, this method is not conducive to copper pairs since there can be many reflections from imperfections, spliced joints, etc., which may mask the ultimate reflection, if any, from the end of the cable. Also, although most telephones are quite well matched to the line in the voice band (when they are on-hook), they may not produce a reflection at a TDR impulse at the point where it may be most useful; in off-hook scenarios telephones are not matched to the line and will have erratic reflection coefficients. Equally, the number of telephones connected at a customer's premises, and hence the differing impedance produced, could cause spurious results. The main difficulty is that TDR measurements require a fast pulse to operate accurately. This is not possible with copper cables beyond a few hundred metres in length, since the reflected signal will be lost in background noise. Again, therefore, this method is not appropriate.

Line assessment and its suitability for broadband-type services has also envisaged the use of an up-stream test that involves the user directly. Specifically, a potential subscriber who wishes to be considered for a particular broadband services dials a free phone (i.e. toll free) number and is then provided with an automated instruction. Specifically, the instruction requests that the potential subscriber enters a predetermined code, such as #3, on a dual tone multiple frequency (DTMF) keypad, which predetermined tones can then be assessed at receipt by the exchange with respect to data integrity and received signal level, for example. More specifically, an assessment may, in fact, take the form of cross-referencing a look-up table formed from empirical data previously derived from testing known links at audio and broadband frequencies, whereafter the suitability of a specific link under tested is assessed by way of comparison. Alternatively, an algorithm may be provided to project the expected behaviour of the link with broadband signals from the received audio frequency signal.

However, the use of standardised telephony tones emanating from a subscriber terminal is not ideal since such telephony tones are presently only defined within a predetermined but relatively wide tolerance, while the test tones are also (usually) transmitted in the voice band (which is unrelated to the spectrum of interest). Consequently, some error exists in any quantitative assessment at the exchange because of the uncertainty present in the absolute transmitted level, with this basic method also requiring the potential subscriber having access to a DTMF keypad. As such, an absolute level of attenuation caused by the wireline cannot be assessed, especially for high frequencies.

An alternative but similar approach to the one described immediately above obviates the necessity for a DTMF keypad, while also potentially reducing the error associated with the uncertainty in the transmitted level. Specifically, in response to a service query, the operator sends the potential subscriber a dongle that is inserted in-line by the potential subscriber. The dongle has a predetermined tone output that is defined within a much stricter limit than DTMF, and so a subsequent quantification of the level inherently yields a more accurate result of uplink attenuation. Indeed, the dongle need not be restricted to a voiceband transmission and could therefore output a test signal in the frequency spectrum of interest. However, a drawback with this method is that there is still some uncertainty associated with a level of a transmitted test signal.

Uplink measurement techniques are described in UK patent application number 9811984.5 that was filed on Jun. 5, 1998 in the name Northern Telecom Limited, and which UK patent application is further identified by its title "METHOD OF AND APPARATUS FOR TESTING A TELECOMMUNICATIONS LINK" and the first named inventor R. J. Williamson.

Additionally, both of the uplink measurement methods rely upon a potential subscriber independently and directly contacting the operator. Consequently, the operator is entirely reactive to demand since it is must rely upon a direct subscriber action before initially either the test or in sending out a dongle. In other words, the operator is unable to advise all its available clients of the possibility to upgrade their respective services, which immediately inhibits its ability both to encourage subscription to the enhanced service and to optimise its revenue. Ideally, operators generally prefer to be proactive, and therefore to approach existing clients with a offer to install the enhanced service that is already available by virtue of the wireline communication resource being of a standard sufficiently high to support an enhanced service, such as broadband xDSL data.

Notwithstanding the foregoing techniques, it is generally considered that, to date, an accurate assessment of a loop for broadband and wideband applications, such as ADSL and VDSL, can only be obtained using attenuation measurements at the relatively high frequencies used for these services. Moreover, in the case of an ADSL scheme, it is considered necessary to measure the loop over its full reach, namely from the exchange to the customer's premises. For VDSL, which use higher frequencies, present techniques only support a loop reach of about one kilometre (1 km), and so measurements are considered necessary on a street cabinet to customer premises basis.

A requirement therefore exists for a method and apparatus of testing a wireline communication resource that can address at least some of the deficiencies in the prior art, which method preferably can be employed to assess a number of alternative enhanced data services.

SUMMARY OF THE INVENTION

According to a first aspect of the present invention there is provided a method of assessing suitability of a wireline communication resource for supporting data transmissions at relatively high frequency between an infrastructure node and a subscriber terminal, the wireline communication resource inherently arranged to support voice band transmissions at relatively low frequency, the method comprising the steps of: at a test point, sending a test signal at the relatively high frequency to the subscriber terminal, the test signal having a predetermined level; detecting an attenuated level of the test signal at the subscriber terminal; communicating an indication of the attenuated level of the test signal to the test point; and at the test point, assessing the suitability of the wireline communication resource for supporting data transmission at relatively high frequency based upon receipt of the indication of the attenuated level and the predetermined level.

In a preferred embodiment, the method further comprises the step of: communicating the indication of the attenuated level to the test point further comprises the step of regulating a current of the wireline communication resource in response to the current generated to be representative of the attenuated level; and the step of assessing further comprises the step of detecting variations in the current through the wireline communication resource to ascertain the level of attenuation.

A DTMF chip can be used to provide a mechanism for generating tones in response to the current representative of the attenuated level, and further to regulate a voltage supplied to a voltage regulator of an associated test circuit with the tones to vary the current drawn by the test circuit from the wireline communication resource.

Alternatively, tone indicative of the attenuated level can be modulated onto the wireline communication resource for detection at the test point.

A further alternative embodiment forms a voice band signal in a non-linear circuit in response to the receipt of the test signal. The voice band signal has an amplitude indicative of a level of attenuation caused to the test signal by the wireline communication resource, and so subsequent modulation of the voice band signal onto the wireline communication resource communicates the attenuation to the test point.

In another aspect of the present invention there is provided a wireline test system for assessing an ability of a wireline communication resource to support data transmissions at relatively high frequencies between an infrastructure node and a subscriber terminal, the wireline communication resource inherently arranged to support voice band transmissions at relatively low frequency, the wireline test system comprising: a) a test desk arranged both to co-ordinate a transmission of relatively high frequency test signals of known level down the wireline communication resource and to assess a level of attenuation caused to the test signal in response to a report signal received subsequently thereby; and b) subscriber associated test circuitry for coupling to the wireline communication resource, the subscriber associated test circuitry comprising: a detector, responsive to the relatively high frequency test signals, for generating a signal representative of an attenuated level of the relatively high frequency test signals through the wireline communication resource; and means for communicating an indication of the attenuated level of the test signal to the test desk.

In a third aspect of the present invention there is provided a subscriber associated test circuitry for coupling to a wireline communication resource inherently arranged to support voice band transmissions at relatively low frequency, the subscriber associated test circuitry further arranged to receive relatively high frequency test signals of known level transmitted to the subscriber associated test circuitry through wireline communication resource, the subscriber associated test circuitry comprising: a detector, responsive to the relatively high frequency test signals, for generating a signal representative of a level of-the relatively high frequency test signals through the wireline communication resource; and means for communicating an indication of the level of attenuation of the test signal to the test desk.

The preferred embodiments of the present invention advantageously provide an accurate method and apparatus for testing a telecommunications link between an exchange and a subscriber, which method is especially applicable in relation to an operator being able to assess the suitability of the telecommunication link for high frequency, broadband-type systems. Beneficially, the method of testing telecommunications link according to the preferred embodiment of the present invention does not require an engineer to visit a subscriber.

The relatively simple circuitry employed in a detector can be easily incorporated into a subscriber terminal, while the exchange provides an accurately controlled test signal that is better suited to making an accurate assessment of wireline properties, especially in relation to the possibility for xDSL communication.

The methods of line assessment of the various aspects of the present invention can be used for different kinds of wireline communication resources, including coaxial systems (e.g. for cable television), twisted pairs and other transmission systems whose attenuation is frequency dependent.

BRIEF DESCRIPTION OF THE DRAWINGS

Embodiments of the present invention will now be described, by way of example, with reference to the accompanying drawings in which.

DETAILED DESCRIPTION OF A PREFERRED EMBODIMENT

Generally, the preferred embodiments of the present invention function to measure high frequency (hf) attenuation of a copper pair using a low cost module that can be inserted into a socket terminating the telephone cabling at a customers premises. More particularly, the module contains a simple high frequency detector having an output that is representative (i.e. a measure) of the level of a received test signal launched into the copper pair at a network end, i.e. typically at an exchange. Consequently, the module (which may co-operate with a subscriber terminal) provides an indication into the network that can be assessed by the operator, with the indication reliably transmitted in the voice band for generally assured recovery.

Figure 1:
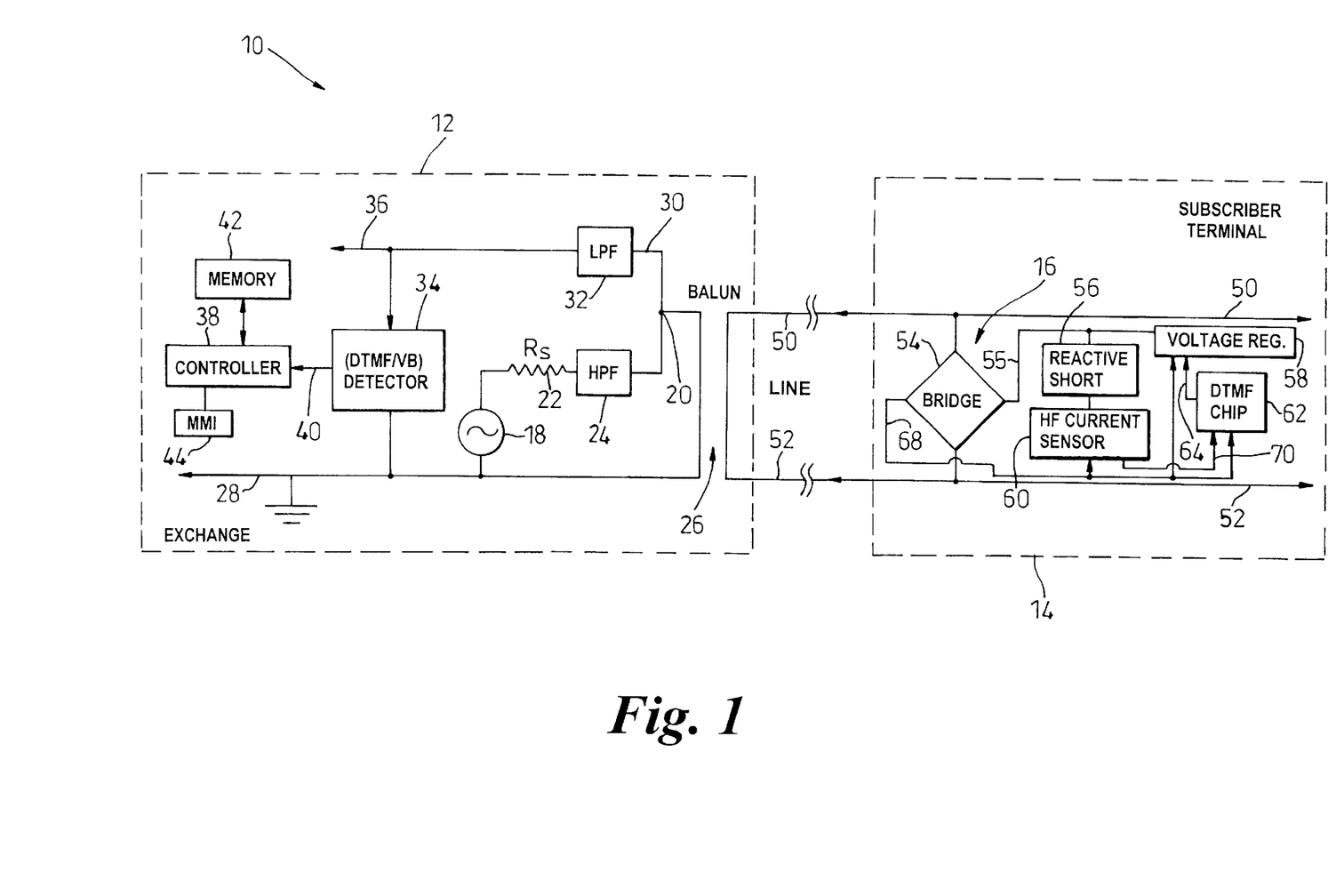
FIG. 1 is a block diagram of a wireline communication system having exchange and subscriber-related equipment containing test circuitry embodying preferred features of the present invention.

FIG. 1 is a block diagram of a wireline communication system 10 having exchange test system 12 and subscriber-related equipment 14 containing test circuitry 16 embodying preferred features of the present invention. As will be appreciated, the exchange 10 is coupled to a multiplicity of subscriber terminals, although for the sake of clarity only a single subscriber entity is shown.

As will become apparent, since the test circuitry 16 may contain some common components with a subscriber terminal, such as a conventional telephone, certain components may be shared between the subscriber terminal 14 and the test circuitry 16. Consequently, while the test circuitry (i.e. assessment and response circuitry) is shown to be integral with a subscriber handset, it will be readily appreciated that the test circuitry is more typically provided as a low-cost add-on module that is inserted in-line, e.g. the circuitry can be realised in a dongle. Moreover, should the configuration of the subscriber terminal support access to common functional components, the construction of the dongle can be simplified and connection into the telephone circuitry provided by a suitable interface. In this latter respect, provided that any interface is easily manufactured and the common telephony circuitry readily accessible, a dongle that utilises shared components can be manufactured beneficially at a lower cost than a fully configured dongle having all necessary assessment and response circuitry.

Generally, the module (i.e. the assessment and response circuitry) is coupled across a customer's line and is transparent to normal low frequency voice band transmissions (at frequencies typically below about 4 kHz). For accurate measurements, the impedance of the module is defined at the frequency of measurement. However, since the impedance of domestic telephony equipment is undefined outside voice band frequencies, a low impedance is selected for the module. The low impedance can, in fact, be obtained from a simple reactive circuit, and so the detector will therefore be most sensitive to current variations.

The exchange test system 12 of system 10 of FIG. 1 provides a base for signal generation circuitry that launches a high frequency test signal into the copper pair under test and detection circuitry that assesses a response returned from the end point subscriber. Of course, the circuitry could be located, if desired, at another base, such as within a street cabinet or at a dedicated test desk that is an adjunct to the exchange. Indeed, the signal generation circuitry and test and detection circuitry need not be collocated. Furthermore, it may be preferably to select a different test point within the communication network, e.g. in relation to assessing transmission distances that warrant or necessitate a shorter loop test.

With more specific regard to the configuration of the test circuitry in the exchange, an output signal generator 18 has a characteristic source impedance (as opposed to the DC loop resistance) that matches the line at the frequency of operation of the high frequency generator 18. As will be understood, matching of the characteristic impedance of the signal generator with that of the line is preferably to ensure maximum power transfer. The characteristic source impedance will actually vary from country to country since telecommunication systems have slightly different physical implementations, with a typical characteristic impedance in the range between about 100 Ω and 130 Ω. The signal generator 18 is coupled in series to a circuit node 20 through a combination of a resistor 22 and a high pass filter 24. The circuit node 20 is coupled to a first end on a first winding of a balanced/unbalanced (balun) transformer 26. A second end of the first winding of the balun transformer 26 is coupled to a circuit earth 28 together with the other end of the signal generator 18. The circuit node 20 also provides a point of division for low frequency and high frequency signals, with a low frequency path 30 passing through a low pass filter 32 to a detector 34 (in this instance operable to detect DTMF).

Of course, the exchange test system 12 forms part of an exchange having power and relay functions, with the relay functions providing a spur to the exchange test system for selected incoming signals.

The detector 34 is further coupled to a controller 38 that is arranged to interpret signals 40 that emanate from the detector and which are representative of a detected level. The controller has some associated memory 42 that stores a database of line suitability criteria against transmission scheme type, which database is accessible by the controller 38. The controller 38 is therefore able to contrast the signals 40 with the data base information and, optionally, to provide a report on a man-machine interface (MMI) 44.

In use, the high pass filter 24 and the low pass filter 32 operate to provide isolation between transmission and reception paths. The high pass filter 24 allows the passage of a high frequency signals to a connected copper pair, while the low pass filter permits the passage of voice band signals to the detector 34.

Neither the low pass filter 32 nor the DTMF detector 34 need to be line driven since they can be locally powered, if necessary.

As will be appreciated, the exchange test system 12 is coupled to each copper pair (comprised from ring conductor 50 and tip conductor 52) through the balun transformer 26 and via a relay. Irrespective of whether the test circuitry 16 is located within a dedicated in-line module or partially or entirely within the subscriber terminal 14, the test circuitry generally has the following structure. A diode bridge rectifier 54 is coupled across the ring conductor 50 and tip conductor 52. A first output 55 from the bridge rectifier 54 provides both an input to a reactive short 56, such as a capacitor, that functions as an ac short at high frequencies and an input to a voltage regulator 58. The reactive short 56 is coupled to a high frequency current sensor 60.

The first output 55 from the bridge actually contains two components, namely a dc component and a high frequency component that is twice the frequency of the line input. The dc component is generally used to provide power, whereas the high frequency ($2f_{in}$) component appears across the combination of the reactive short 56 and the high frequency current sensor 60. In other words, the effective frequency across the reactive short and the high frequency current sensor is $2f_{in}$.

The first output 55 from the bridge rectifier 54 therefore provides a dc voltage to supply power to the voltage regulator 58 that in turn provides power to a DTMF (dialling) chip 62. The DTMF chip 62 also provides feedback to the voltage regulator through control line 64

A second output 68 from the bridge rectifier 54 provides a return path to both the DTMF chip 62 and the high frequency current sensor 60. Consequently, the DTMF chip 62 is conventionally line powered through a bridge rectifier. The high frequency current sensor 60 is also coupled to the DTMF chip 62 through a control line 70.

In operation, the high frequency current sensor measures and determines a level of the current of the incoming high frequency signals originating from the signal generator 18. More particularly, the line-attenuated level of $2f_{in}$ is communicated to the control chip 62 to initiate generation of a control tone that is then applied via control line 64 to the voltage regulator 58; a practical realisation uses a DTMF chip (as the control chip 62) and DTMF tones. Application of the DTMF tones to the voltage regulator effectively modulates the power supplied by the voltage regulator 58 to the DTMF chip 62. Therefore, the amount of current drawn by the voltage regulator 58 from the bridge 54 varies according to the level of the high frequency component of the first output, with the variation in the amount of current therefore effectively modulated back into the line 50-52 through the use of control tones.

In other words, tones generated by the DTMF chip 62 in response to incident but attenuated high frequency test signals can be detected by test equipment (i.e. detector 34) in the exchange test system 12, with the tones generated by the associated subscriber equipment directly associated with line attenuation. As will be understood, DTMF supports the generation of sixteen tones and so each set of tones is arranged to correspond to a particular level of the high frequency current.

In relation to detection at the exchange test system 12, the variation in the line current is detectable by detector 34, which detector converts the line current variation into a quantified level (preferably in terms of DTMF tones) that can be interpreted by the controller 38. More specifically, the controller 38 is able to assess a relative change in the initial test signal level with respect to the quantified level determined by detector 34, i.e. the attenuation properties of the line can be assessed.

The test module or dongle associated with the subscriber terminal is able to work whilst the loop is resting, i.e. the telephone is not in use and is therefore in an on-hook state. Preferably, therefore, the current drawn by the test circuit 16 is less than that required to signal the presence of a voice call, i.e. the current drawn by the test is insufficient to initiate the line card at the central office or exchange.

In the event that active circuits require too much dc current from a collocated battery, an ac signal can be applied to the line to supply the necessary power (which is, in fact, the preferable mechanism for power supply, as described in relation to FIG. 1). Again, it is emphasised that, preferably, an ac signal should be of sufficiently high frequency and sufficiently low level to prevent inappropriate activation of the ringing circuit in the existing telephony equipment.

In summary of the first test method, a level detector associated with the subscriber terminal detects a level of an attenuated test signal transmitted to it by the exchange. The level detector (e.g. the high frequency current sensor 60) then activates a DTMF chip that effectively modulates the current on the line and allows detection at the exchange (and more particularly at the subscriber's line card or at a dedicated test desk). The line card or test desk therefore facilitates the determination of a level of attenuation in the downlink communication to the subscriber terminal since the original level of the test signal is accurately known.

The test system can be controlled, in a general sense, from anywhere within the communication network, while the test can be initiated independently of or in response to a subscriber initiating a request concerning the provision of enhanced data services over its existing wireline resource.

Figure 2:
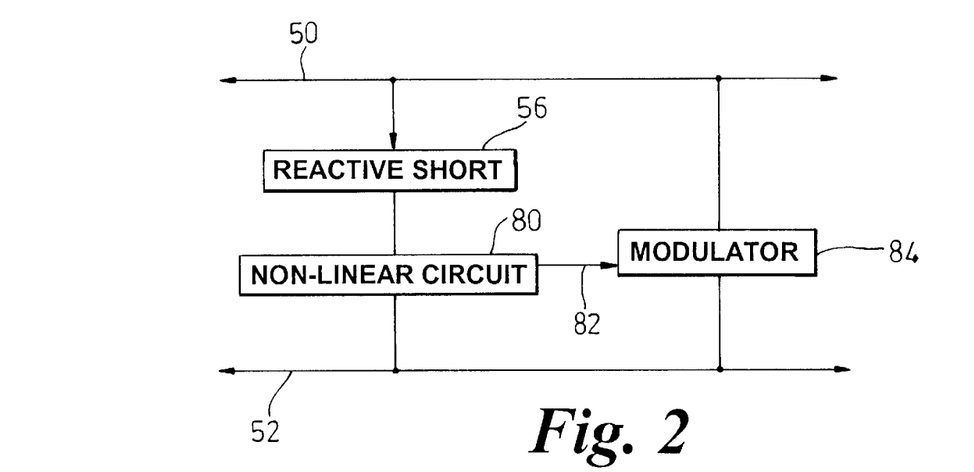
FIG. 2 is block diagram of subscriber-related signal assessment circuitry of an alternative embodiment of the present invention.

An alternative structure and detection mechanism for association with the subscriber terminal is shown in FIG. 2 in which a non-linear circuit mixes the frequencies of the incoming high frequency signal to create a voice band signal that is launched back into the line. Specifically, it will be readily appreciated that two frequencies will produce a frequency component at the sum of the two frequencies plus a low frequency component at a difference frequency of the two frequencies. Selection of two relatively close frequencies can therefore generate a difference frequency that inherently sits within the voice band, i.e. at a frequency at about or preferably below 4 kHz.

Considering the ring 50 and tip 52 conductors of the line, a reactive short 56 (such as an ac blocking capacitor) is coupled in series with a non-linear circuit 80, with this combination appearing across the line 50-52. The non-linea circuit 80 may be comprised from a diode-resistor combination, with the diode effectively mixing together the incident frequency signals and wherein the amplitude of the difference frequency (appearing across the resistor) is directly proportional to the amplitude of the two incoming (incident) frequency components. From a practical viewpoint, the individual frequency components inserted onto the line 50-52 at the exchange are arranged such that a difference frequency therebetween generates a voice band signal in the region of (and preferably less than) 4 kHz. Moreover, this embodiment of the present invention allows two high frequency signals in the desired frequency band of transmission to be sent to the subscriber terminal, with a difference between the two frequency components being such that they combine to provide a difference frequency that is in the voice band.

Of course, the alternative mechanism can use more then two frequencies to generate a return signal in the voice band, and the injected signals preferably having a frequency separation sufficient to support generation of voice band signals (that are less susceptible to attenuation and hence more likely to be received across the twisted pair by virtue of the wireline communication resource being designed to support such voice band signals). The concept of generating a voice band signal at the test site from multiple test signals transmitted from the exchange can be extended such that the voice band signal has a varying frequency, i.e. the difference frequency between the test signals varies (preferably in a predetermined fashion) in order that the system is generally able to perform self-calibration in relation to low frequency attenuation of the loop.

The non-linear circuit 80 has an output 82 that is coupled to a means of modulating the line 84, such as a thyristor or transformer, that is powered across the line 50-52 and positioned in parallel to the series combination of the reactive short 56 and the non-linear circuit 80. As previously indicated, the amplitude of the difference frequencies is proportional to the amplitude of the original frequency components. Since the means for modulating the line 84 appears across the line 50-52, determination of the amplitude of the difference frequency provides an indication of attenuation, while the modulator is able to relay this attenuated level to the exchange (and specifically the subscriber line card or dedicated test desk) by causing the amount of current drawn from the line to vary with time, i.e. the modulator effectively modulates the line current which modulation can be detected at the subscriber's line card or at the test desk (as previously described in relation to FIG. 1).

Again, the module is able to work whilst the loop is resting, i.e. the telephone is not in use and is therefore on-hook. Preferably, therefore, the current drawn by the means for modulating the line 84 is less than that required to signal the presence of a voice call, i.e. the amount of current drawn is insufficient to generate ringing in the subscriber terminal.

Alternatively, the means for modulating the line 84 can be used to directly modulate the difference frequency (sited in the voiceband) onto the line 50-52 and such that the difference frequency can be used to test the return path back to the exchange test system 12. The transmission of the two high frequency components to the subscriber equipment in the high frequency band of interest results in attenuation of each of respective amplitude, as will be understood. Then, after combination of the high frequency components to generate the difference frequency in the voice band and its subsequent transmission on the up-link to the exchange, the voice band signal is also attenuated by the line (albeit to a lesser extent than the high frequency components). Detection at the exchange test system 12 of a level of the voice band signal can then be used to assess overall line attenuation (having regard to the initial amplitudes of the frequency components), although this assessment includes an error or inaccuracy that beneficially over-estimates high frequency attenuation. More explicitly, it will be appreciated that, in reality, a signal will not be looped back to its point of origination and so the attenuation applied to the difference frequency (i.e. the generated voice band signal) in the return path will not be present. In other words, in relation to the created voice band signal, attenuation in the uplink results in an over-estimation of the high frequency attenuation of the loop (as a consequence of voice band transmission having a more stable attenuation rate, as previously indicated).

From a structural viewpoint, the test circuitry at the exchange test system 12 requires slight adaptation to that previously described in relation to FIG. 1. Specifically, the test circuitry associated with the exchange of FIG. 1 is merely replaced by a voice band detector, while the remaining circuitry is unchanged.

Since the attenuation of signals at voice band is sufficiently less than at high frequency, the level of inaccuracy may be adequate. However, if greater accuracy is required, a number of alternative methods are available. One method is to use the value of the off-hook voltage of the subscriber's line card as a measure of loop resistance. The relationship will depend on the type of the line card, such as whether it is constant voltage or current. Consequently, the loop resistance provided by the off-hook condition can provide an indication of the level of attenuation of the copper pair in the up-link and in the voice band, which indication can then be used to modify the assessed high frequency capability of the copper pair.

Another method of providing increased accuracy with respect to high frequency capabilities of the line is to use a module or dongle associated with the subscriber terminal itself to calibrate the loss of the line at voice frequencies by sending a suitable voice band signal back to the detector in the exchange. The voice band signal communicated back to the exchange is, preferably, inherently derivable from and directly proportional to an incident high frequency test signal(s) sent from the test equipment (or the exchange) to the subscriber terminal. In this instance, the non-linear circuit 80 creates the voice band signal (e.g. by using the intermodulation product of two high frequency signals or the harmonics associated with an incident high frequency test signal, or by suitable modulation, such as amplitude modulation, where the modulation frequency is in the voice band). Application of the voice band signal to the means for modulating the line 84 then supports the communication of wireline attenuation information back to the exchange, as previously described.

The latter techniques will, however, generally require a modification of the reactive short 56 such that the voice band signals (generated, for example, from the intermodulation products) can be passed to the detector in the exchange while the CPE module, in general, maintains a high impedance at normal telephone (POTS) usage. For example, the non-linear termination in the CPE module can be arranged to operate such that low (amplitude) level signals, indicative of normal voice communication, are blocked by a high impedance (i.e. high impedance for low voltage) whereas the non-linear termination (80) is effectively low impedance for high (amplitude) level signals. As will be appreciated, a configuration of back-to-back zenor diodes can operate to provide a varying impedance according to incident signal level amplitudes.

A further enhancement to the method of generating a voice band signal from incident high frequency test signals allows for the calibration out of any loss in line through the use of a varying frequency test signal. Specifically, at least one of the high frequency test signals is varied so as to allow the CPE-based dongle to create differing difference frequency signals in the voice band. By measuring the relative levels of (at least two of) these frequencies (e.g. at 1 kHz and 4 kHz), it is possible to infer the absolute level of attenuation of the loop in the voice band. For instance, in the case of a four kilometre (4 km) loop, the difference in attenuation at 1 kHz and 4 kHz is measured to be nine decibels (9 dB). By using the relative attenuation at two voice band frequencies, one can determine the constants for an analytical expression for the absolute attenuation of the loop in the voice band frequencies. From the analytical expression, it is possible to determine the level of attenuation of the loop at the voice band frequency and hence the absolute level of the voice band signal at the dongle. Since the dongle has a known transfer characteristic, the absolute level of the incident high frequency test signals at the dongle can be calculated. Therefore, since the transmitted level of the high frequency test signals is known, the attenuation of the loop at the high frequencies can be determined.

Again, the test system can be controlled, in a general sense, from anywhere within the communication network, while the test can be initiated independently of or in response to a subscriber initiating a request concerning the provision of enhanced data services over its existing wireline resource. Most preferably, the high frequency test signals are, however, launched into the copper pair from an access point collated or integral with the exchange.

In summary of this second test method proposed above, an output of a detector circuit (e.g. the non-linear circuit) is at voice band frequencies whose amplitude is proportional to incident high frequency components originally sent to the CPE module to assess high frequency attenuation properties of wireline link. The low frequency signal returned to the exchange is then detected and decoded (principally at the line card or test desk) before a determination can be made as to whether the wireline attenuation at high frequencies is acceptable (in view of known operating requirements stored in the memory 42).

Figure 3:
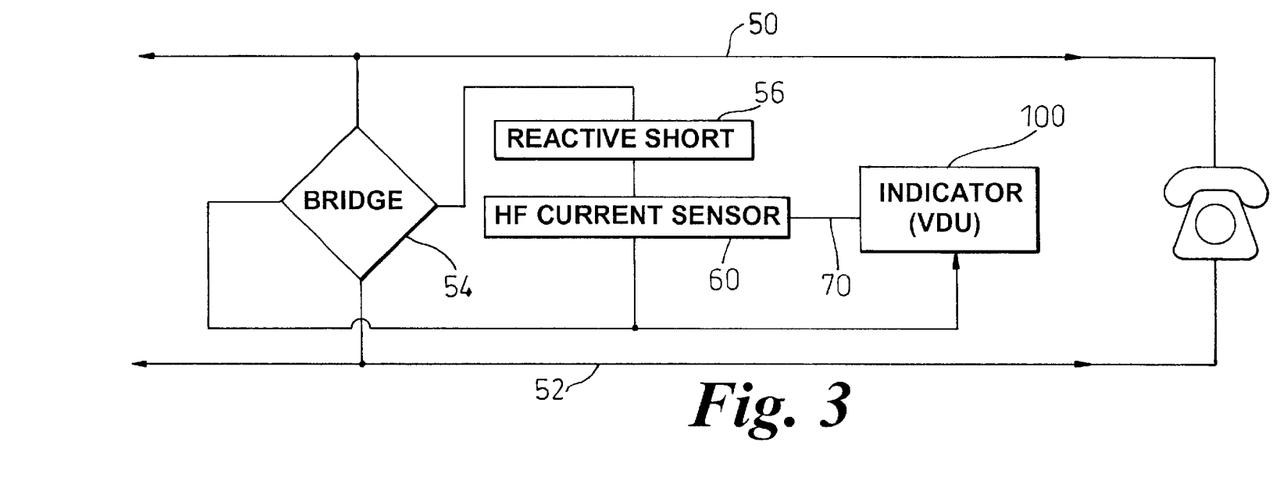
FIG. 3 is schematic diagram of subscriber-related signal assessment circuitry of an another embodiment of the present invention.

In yet another embodiment of the present invention there is provided an attenuation test mechanism as supported by the CPE apparatus (e.g. a dedicated module) of FIG. 3. Generally, FIG. 3 contains the same circuit configuration as the corresponding CPE module/apparatus of FIG. 1, although the complexity of the module has been reduced by the substitution of a sensual indicator 100, such as a LCD or LED vu meter, in the place of the voltage regulator and interconnected DTMF chip. In response to incoming high frequency signals, the current sensor (ultimately) generates an output proportional to an amplitude of the incident high frequency signals, with the output then applied to vary the appearance of the indicator 100, e.g. by illuminating or distinguishing discrete pixels or blocks in an LCD display. Since the wireline between the exchange and CPE has attenuated the high frequency test signals, the level of illumination on the indicator varies as a function of high frequency signal attenuation. A customer is then able to observe directly the indicator 100 and report the observations either verbally or through the use of a touch tone phone 102 coupled to the line 50-52.

Figure 4:
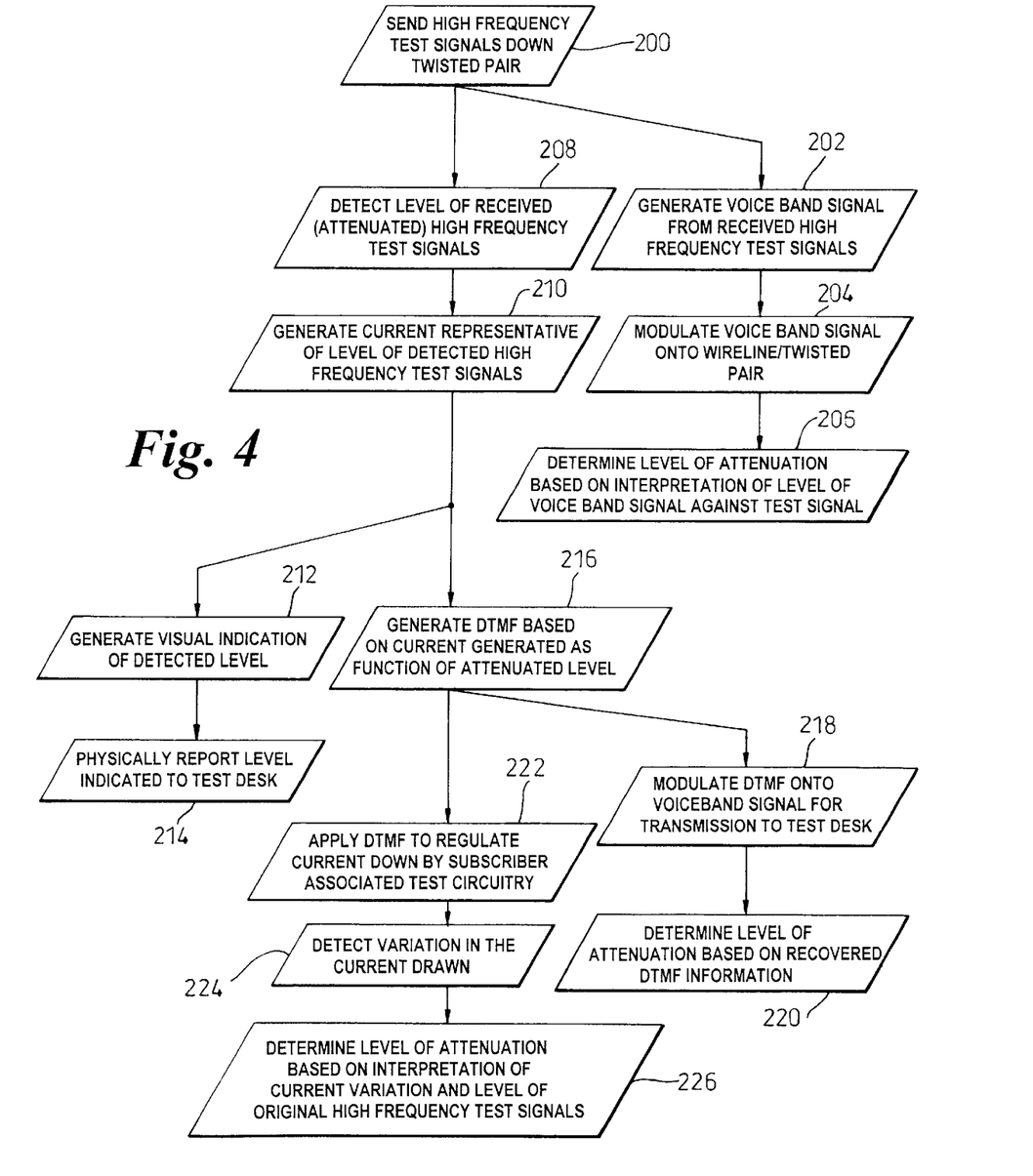
FIG. 4 is a flow chart indicating the principal procedural steps undertaken in a method of testing a wireline communication resource according to various preferred embodiments of the present invention.

FIG. 4 is a flow chart indicating the principal procedural steps undertaken in a method of testing a wireline communication resource according to the various preferred embodiments of the present invention. Briefly referring to that figure, the various embodiments can be seen to share a common stem in that a test desk sends high frequency test signals down a wireline communication resource, such as a twisted pair (step 200). There are two possible paths that can be taken in order to facilitate assessment of high frequency attenuation by the twisted pair.

First, as previously indicated, voice band signals can be generated from the high frequency test signals (step 202), which voice band signals can then be modulated onto the twisted pair (step 204). Then, the test desk can determine the level of attenuation based on interpretation of the level of the voice band signals against the original test signal(s), as in step 206.

The second path requires a determination of the level of the high frequency (attenuated) test signals (step 208) and the generation of a current representative of the level of the detected high frequency test signals (step 210).

At this point, the subscriber associated test circuitry can generate visual indication of the detected level based on the current (step 212), and a subscriber can then physically report the visual level indicated to the test desk (step 214). In an alternative path, the current can be used to generate a corresponding tone as a function of the detected but attenuated level of the high frequency test signals (step 216). The tones can then be used in one of two ways:

1) to modulate a voice band signal for subsequent transmission to the test desk (step 218), whereafter the level of attenuation of the high frequency signals is assessed based on recovered DTMF information (step 220);

2) to regulate current drawn by the subscriber associated test circuitry (step 222), whereafter the test desk detects the variation in the amount of current drawn from the wireline communication resource (step 224) and the subsequent determination of the level of attenuation at high frequencies based on an interpretation of the current variation and the original amplitude of the high frequency test signals (step 226).

It will, of course, be appreciated that the above description has been given by way of example only and that modification in detail may be made within the scope of the present invention. For example, the configuration of FIG. 2 could be modified by that of FIG. 1 in that the non-linear circuit is again replaced by a high frequency current sensor which co-operates with the modulator to provide frequency modulation of a DTMF tone (indicative of a level of attenuation) in the voice band, which DTMF tone is then detected at a test point for subsequent use in line assessment.

While it is preferable (particularly on a cost basis) for the test signals to be sent to the CPE, this is not a limiting feature of the underlying inventive concept and, consequently, reverse test transmission from the CPE are also envisaged.

As the context requires, the term "data" should be considered as meaning digitised voice signals as well as digitally encrypted data, e.g. a binary bit sequence for a computer, whereby modulation of the high frequency carriers is by effected by both analog signals and digitally-based information-bearing sequences. Furthermore, the term "test point" should be considered as a generic indication of a point of assessment and, as such, includes the test desk, the line card or any suitable circuitry in the infrastructure. Indeed, the test signal can be inserted and detected from any accessible point in an access network, such as a primary connection point (PCP) located in a street cabinet, although the low frequency test equipment (for receipt of the indication of the attenuated level of the test signal) is more likely to be located at the exchange. In fact, in a VDSL environment, the high frequency signals are preferably inserted into the wireline communication resource at the PCP in view of the line lengths that exist between street cabinets and CPEs in full service access network (FSAN) architectures.

What is claimed is:

1. A method of assessing suitability of a wireline communication resource for supporting data transmissions at relatively high frequency between an infrastructure node and a subscriber terminal, the wireline communication resource inherently arranged to support voice band transmissions at relatively low frequency, the method comprising the steps of:

at a test point, sending a test signal at the relatively high frequency to the subscriber terminal, the test signal having a predetermined level;

detecting an attenuated level of the test signal at the subscriber terminal;

communicating an indication of the attenuated level of the test signal to the test point; and at the test point, assessing the suitability of the wireline communication resource for supporting data transmission at relatively high frequency based upon receipt of the indication of the attenuated level and the predetermined level.

2. The method of assessing suitability of a wireline communication resource according to claim 1, wherein the step of detecting the attenuated level further comprises the step of generating a current representative of the attenuated level.

3. The method of assessing suitability of a wireline communication resource according to claim 2, wherein:

the step of communicating the indication of the attenuated level to the test point further comprises the step of regulating a current of the wireline communication resource in response to the current generated to be representative of the attenuated level; and the step of assessing further comprises the step of detecting variations in the current through the wireline communication resource to ascertain the level of attenuation.

4. The method of assessing suitability of a wireline communication resource according to claim 3, wherein the subscriber terminal has an associated test circuit that draws current from the wireline communication resource and the method further comprising the steps of:

generating tones in response to the current representative of the attenuated level; and regulating a voltage supplied to a voltage regulator of the test circuit with said tones to vary the current drawn by the test circuit from the wireline communication resource.

5. The method of assessing suitability of a wireline communication resource according to claim 2, the method further comprising the steps of:

generating tones in response to the current representative of the attenuated level; and modulating the tones onto the wireline communication resource for detection at the test point.

6. The method of assessing suitability of a wireline communication resource according to claim 5, wherein the step of modulating comprises the step of sending the modulated tones in the voice band.

7. The method of assessing suitability of a wireline communication resource according to claim 1, wherein the subscriber terminal has an associated test circuit comprising a non-linear circuit and a means for modulating and the method further comprises the step of:

forming a voice band signal in the non-linear circuit in response to receiving the test signal; and modulating the voice band signal onto the wireline communication resource for communication to the test point.

8. The method of assessing suitability of a wireline communication resource according to claim 7, wherein the step of forming the voice band signal includes one of the steps of:

receiving a plurality of high frequency test signals having a frequency separation within a voice band range and mixing the plurality of high frequency test signals to generate the voice band signal; and receiving a high frequency test signal and generating the voice band signal from a harmonic of the high frequency test signal.

9. The method of assessing suitability of a wireline communication resource according to claim 8, further comprising the step of generating a plurality of voice band signals in response to receiving the plurality of high frequency test signals.

10. The method of assessing suitability of a wireline communication resource according to claim 7, wherein an amplitude of the voice band signal is directly proportional to the level of attenuation of the wireline communication resource at the relatively high frequency.

11. The method of assessing suitability of a wireline communication resource according to claim 10, wherein the amplitude of the voice band signal is such as to be distinguishable from relatively low amplitude voice call transmissions.

12. The method of assessing suitability of a wireline communication resource according to claim 1, wherein the wireline communication resource is a twisted pair.

13. The method of assessing suitability of a wireline communication resource according to claim 2, further comprising the step of:

generating a sensual indication of the attenuated level, the sensual indication provided in response to the current generated as being representative of the attenuated level; and having a subscriber verbally report the sensual indication to the test point.

14. A wireline test system for assessing an ability of a wireline communication resource to support data transmissions at relatively high frequencies between an infrastructure node and a subscriber terminal, the wireline communication resource inherently arranged to support voice band transmissions at relatively low frequency, the wireline test system comprising:

a) a test desk arranged both to co-ordinate a transmission of relatively high frequency test signals of known level down the wireline communication resource and to assess a level of attenuation caused to the test signal in response to a report signal received subsequently thereby; and b) subscriber associated test circuitry for coupling to the wireline communication resource, the subscriber associated test circuitry comprising:

a detector, responsive to the relatively high frequency test signals, for generating a signal representative of an attenuated level of the relatively high frequency test signals through the wireline communication resource; and means for communicating an indication of the attenuated level of the test signal to the test desk.

15. The wireline test system of claim 14, wherein the subscriber associated test circuitry further comprises means for generating a current representative of the attenuated level.

16. The wireline test system of claim 15, wherein the means of communicating the indication of the attenuated level further comprises means for regulating a current on the wireline communication resource in response to the current representative of the attenuated level; and the test desk further comprises means of detecting variations in the current through the wireline communication resource to ascertain a level of attenuation at the relatively high frequencies.

17. The wireline test system of claim 16, wherein the subscriber associated test circuitry draws current from the wireline communication resource and the subscriber associated test circuitry further comprises:

a tone generator arranged to generate tones in response to the current representative of the attenuated level, the tone generator further coupled to a voltage regulator and arranged to supply the tones thereto, whereby the tones vary the current drawn by the subscriber associated test circuitry from the wireline communication resource.

18. The wireline test system of claim 15, wherein the subscriber associated test circuitry further comprises:

a tone generator arranged to generate tones in response to the current representative of the attenuated level; and a modulator responsive to the tones and coupled to modulate the tones onto the wireline communication resource for detection at the test desk.

19. The wireline test system of claim 18, wherein the modulator generates tones in the voice band.

20. The wireline test system of claim 14, wherein the subscriber associated test circuitry further comprises:

a non-linear circuit coupled across the wireline communication resource and arranged to form a voice band signal in response to receiving the test signal; and a modulator responsive to the voice band signal and coupled across the wireline communication resource, the modulator arranged to modulate the voice band signal onto the wireline communication resource for communication to the test point.

21. The wireline test system of claim 20, wherein the subscriber associated test circuitry is responsive to a plurality of high frequency test signals having a frequency separation within a voice band range and wherein the non-linear circuit comprises a mixer for mixing th e plurality of high frequency test signals to generate the voice band signal.

22. The wireline test system of claim 20, wherein the non-linear circuit generates the voice band signal from a harmonic of the high frequency test signal.

23. The wireline test system of claim 21, further comprising a reactive short coupled from the wireline communication resource to the non-linear circuit, the reactive short having a high impedance for low amplitude signals and a low impedance for high amplitude signals.

24. Subscriber associated test circuitry for coupling to a wireline communication resource inherently arranged to support voice band transmissions at relatively low frequency, the subscriber associated test circuitry further arranged to receive relatively high frequency test signals of known level transmitted to the subscriber associated test circuitry through wireline communication resource, the subscriber associated test circuitry comprising:

a detector, responsive to the relatively high frequency test signals, for generating a signal representative of a level of the relatively high frequency test signals through the wireline communication resource; and means for communicating an indication of the level of attenuation of the test signal to the test desk.

25. Subscriber associated test circuitry according to claim 24, wherein the subscriber associated test circuitry further comprises means for generating a current representative of the attenuated level.

26. Subscriber associated test circuitry according to claim 25, wherein the means of communicating the indication of the attenuated level further comprises means for regulating a current on the wireline communication resource in response to the current representative of the attenuated level.

27. Subscriber associate d test circuitry according to claim 26, wherein the subscriber associated test circuitry draws current from the wireline communication resource and the subscriber associated test circuitry further comprises:

a tone generator arranged to generate tones in response to the current representative of the attenuated level, the tone generator further coupled to a voltage regulator and arranged to supply the tones thereto, whereby the tones vary the current drawn by the subscriber associated test circuitry from the wireline communication resource.

28. Subscriber associated test circuitry according to claim 25, further comprising:

a tone generator arranged to generate tones in response to the current representative of the attenuated level; and a modulator responsive to the tones and coupled to modulate the tones onto the wireline communication resource.

29. Subscriber associated test circuitry according to claim 28, wherein the modulator generates tones in the voice band.

30. Subscriber associated test circuitry according to claim 24, further comprising:

a non-linear circuit for coupling across the wireline communication resource and arranged to form a voice band signal in response to receiving the test signal; and a modulator responsive to the voice band signal and for coupling across the wireline communication resource, the modulator arranged to modulate the voice band signal onto the wireline communication resource for communication to the test point.

31. Subscriber associated test circuitry according to claim 30, wherein the subscriber associated test circuitry is responsive to a plurality of high frequency test signals having a frequency separation within a voice band range and wherein the non-linear circuit comprises a mixer for mixing the plurality of high frequency test signals to generate the voice band signal.

32. Subscriber associated test circuitry according to claim 30, wherein the non-linear circuit generates the voice band signal from a harmonic of the high frequency test signal.

33. Subscriber associated test circuitry according to claim 31, further comprising a reactive short arranged to be coupled from the wireline communication resource to the non-linear circuit, the reactive short having a high impedance for low amplitude signals and a low impedance for high amplitude signals.

34. Subscriber associated test circuitry according to claim 24, wherein the subscriber associated test circuitry is realised in a dongle.

35. Subscriber associated test circuitry according to claim 24, wherein the wireline communication resource is a twisted pair.

* * * * *